(12) United States Patent
Kim et al.

(10) Patent No.: US 12,394,441 B2
(45) Date of Patent: Aug. 19, 2025

(54) METHOD FOR PROVIDING CUSTOMIZED COOKING CONTENT AND USER TERMINAL FOR IMPLEMENTING THE SAME

(71) Applicant: LG ELECTRONICS INC., Seoul (KR)

(72) Inventors: Bomyeong Kim, Seoul (KR); Haein Lee, Seoul (KR); Hyongguk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 145 days.

(21) Appl. No.: 17/812,667

(22) Filed: Jul. 14, 2022

(65) Prior Publication Data

US 2023/0238033 A1    Jul. 27, 2023

(30) Foreign Application Priority Data

Jan. 25, 2022  (KR) ......................... 10-2022-0010489

(51) Int. Cl.
  *G11B 27/00* (2006.01)
  *G06V 10/70* (2022.01)
  *G10L 15/22* (2006.01)

(52) U.S. Cl.
  CPC ............ *G11B 27/005* (2013.01); *G06V 10/70* (2022.01); *G10L 15/22* (2013.01); *G10L 2015/223* (2013.01)

(58) Field of Classification Search
  CPC ........ G06V 10/70; G06V 20/68; G06V 40/28; H05B 6/6447; H05B 6/668; A23L 5/00;
  (Continued)

(56) References Cited

U.S. PATENT DOCUMENTS 8,342,847 B2  1/2013 Do et al.
10,919,144 B2  2/2021 Sinnet et al.
(Continued)

FOREIGN PATENT DOCUMENTS

KR  10-2016-0058438  5/2016
KR  1020180049662  5/2018
(Continued)

OTHER PUBLICATIONS

European Patent Office Application Serial No. 22172899.1, Search Report dated Oct. 11, 2022, 11 pages.
(Continued)

*Primary Examiner* — Thai Q Tran
*Assistant Examiner* — Nienru Yang
(74) *Attorney, Agent, or Firm* — LEE, HONG, DEGERMAN, KANG & WAIMEY

(57) ABSTRACT

The present disclosure is to provide a method for providing customized cooking content and a user terminal for implementing the same that may increase a quality of the dish and interest in cooking by allowing a user to cook at a pace that suits a user's level in consideration of cooking skills of the user, and may provide an environment more suitable for cooking in association with a near kitchen tool and/or home appliance. Provided is a user terminal including a display, a camera, and a controller for performing control to recognize information about a cooking process appearing in cooking content via artificial intelligence, recognize, via the artificial intelligence, a cooking situation of a user filmed via the camera during reproduction of the cooking content, and adjust a reproduction speed of the cooking content based on the cooking process of the cooking content and the cooking situation of the user.

17 Claims, 13 Drawing Sheets

(58) Field of Classification Search
CPC ...... A47J 36/321; F24C 7/082; G11B 27/005; G10L 15/22; G10L 2015/223
USPC ............................................. 386/200
See application file for complete search history.

(56) References Cited

U.S. PATENT DOCUMENTS

| | | | |
|---|---|---|---|
| 2018/0268865 A1* | 9/2018 | Ekambaram | G11B 27/005 |
| 2019/0005954 A1* | 1/2019 | Xie | G10L 15/30 |
| 2019/0068681 A1* | 2/2019 | Boyce | H04L 67/025 |
| 2020/0099858 A1* | 3/2020 | Lee | G06F 3/011 |
| 2020/0333016 A1* | 10/2020 | Chung | G06Q 90/00 |
| 2021/0209465 A1* | 7/2021 | Maeng | G06N 3/08 |
| 2021/0228022 A1* | 7/2021 | Liu | A47J 36/321 |
| 2021/0243498 A1 | 8/2021 | Goslin et al. | |
| 2021/0251263 A1 | 8/2021 | Knighton et al. | |
| 2021/0387350 A1* | 12/2021 | Oleynik | A47J 44/00 |

FOREIGN PATENT DOCUMENTS

| | | |
|---|---|---|
| KR | 10-2019-0084556 | 7/2019 |
| KR | 10-2020-0080389 | 7/2020 |
| KR | 10-2021-0067604 | 6/2021 |

OTHER PUBLICATIONS

Korean Intellectual Property Office Application No. 10-2022-0010489, Office Action dated Apr. 22, 2024, 10 pages.

\* cited by examiner

FIG. 5
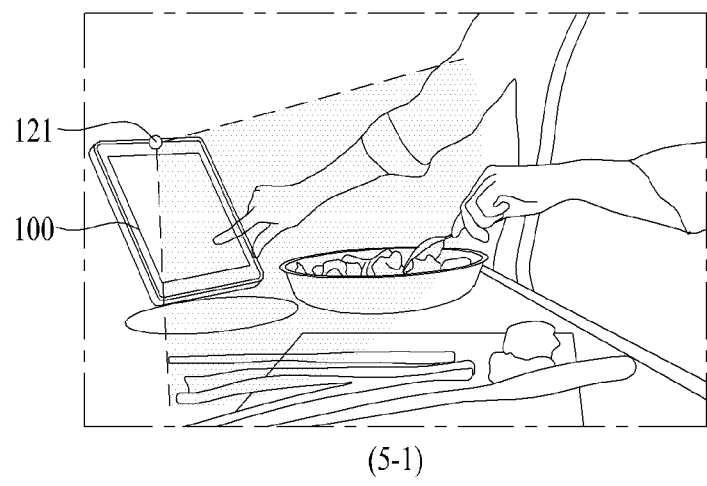
(5-1)
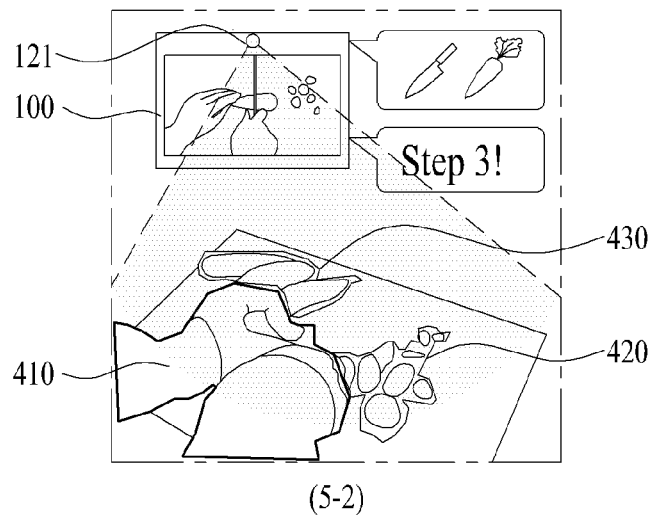
(5-2)
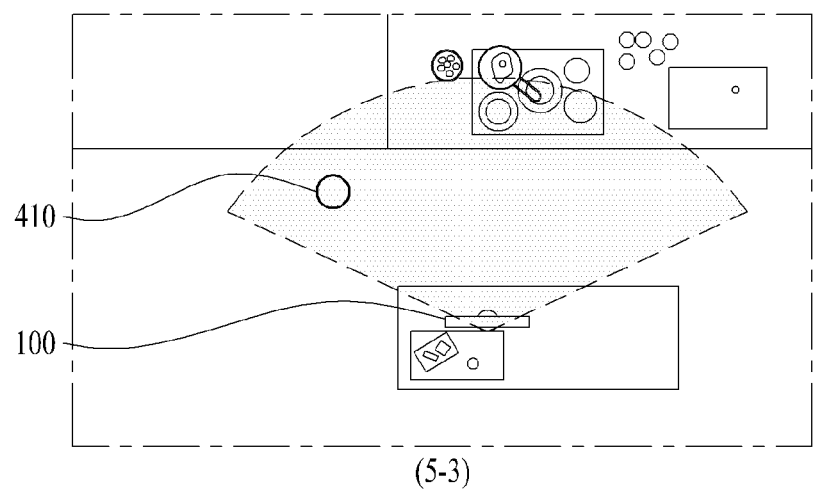
(5-3)

FIG. 12
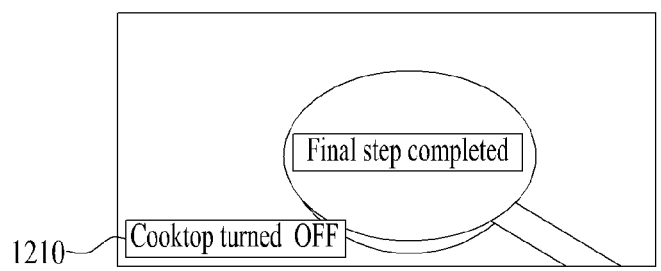
(12-1)
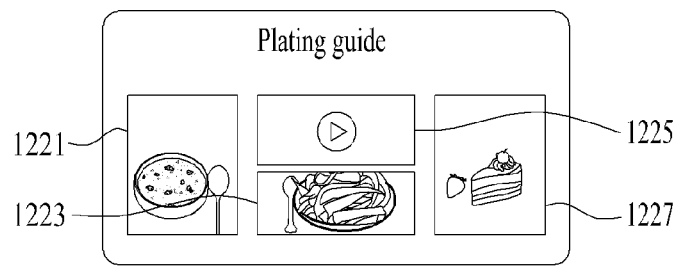
(12-2)
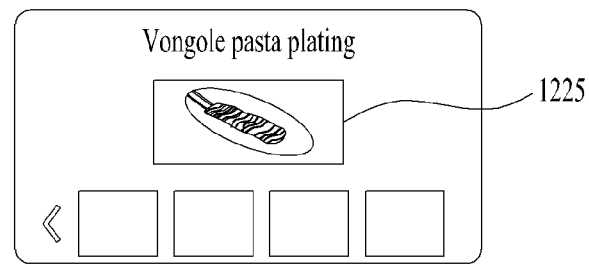
(12-3)

METHOD FOR PROVIDING CUSTOMIZED COOKING CONTENT AND USER TERMINAL FOR IMPLEMENTING THE SAME

Pursuant to 35 U.S.C. § 119(a), this application claims the benefit of earlier filing date and right of priority to Korean Patent Application No. 10-2022-0010489 filed on Jan. 25, 2022, the contents of which are hereby incorporated by reference herein in its entirety.

BACKGROUND

Field

The present disclosure relates to a method for providing customized cooking content and a terminal for implementing the same.

Discussion of the Related Art

User terminals may be generally classified as mobile/portable terminals or stationary terminals according to their mobility. User terminals may also be classified as handheld terminals or vehicle mounted terminals according to whether or not a user can directly carry the terminal.

User terminals have become increasingly more functional. Examples of such functions include data and voice communications, capturing images and video via a camera, recording audio, playing music files via a speaker system, and displaying images and video on a display. Some user terminals include additional functionality which supports game playing, while other terminals are configured as multimedia players. More recently, user terminals have been configured to receive broadcast and multicast signals which permit viewing of content such as videos and television programs.

User terminals may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, user terminals have been configured to receive broadcast and multicast signals which permit viewing of contents, such as videos and television programs.

Efforts are ongoing to support and increase the functionality of user terminals. Such efforts include software and hardware improvements, as well as changes and improvements in the structural components.

Recently, many people are interested in cooking, and in fact, various cooking-related broadcasts or Internet contents are newly released.

For example, a user may receive a cooking content for making a desired dish online via the user terminal and may make the desired dish following the cooking content.

However, despite a fact that cooking skills of the users are different, such cooking content provides a unilaterally prepared cooking program without considering such fact. Therefore, a case in which the user easily loses interest in cooking occurs often because it is difficult for the user to follow or a cooking program that is too easy for the user is provided.

In addition, in a case of a recent kitchen appliance, particularly, a kitchen heating apparatus such as a cooktop and an electric oven, output thereof varies depending on a manufacturer and/or a released model, so that criteria for a 'high/medium/low heating intensity' guided in the cooking content may be different from criteria for the 'high/medium/low heating intensity' of the kitchen heating apparatus at home. Therefore, even when the user cooks using the kitchen heating apparatus as suggested in the cooking content, the cooking may fail.

SUMMARY

Accordingly, embodiments of the present disclosure are directed to a method for providing customized cooking content and a user terminal for implementing the same that substantially obviate one or more problems due to limitations and disadvantages of the related art.

The present disclosure is to provide a method for providing customized cooking content and a user terminal for implementing the same that may increase a quality of the dish and interest in cooking by allowing a user to cook at a pace that suits a user's level in consideration of cooking skills of the user, and may provide an environment more suitable for cooking in association with a near kitchen tool and/or home appliance.

To achieve the purpose as described above, according to one aspect of the present disclosure, provided is a user terminal including a display, a camera, and a controller that performs control to recognize information about a cooking process appearing in cooking content via artificial intelligence, recognize, via the artificial intelligence, a cooking situation of a user filmed or detected via the camera during reproduction of the cooking content, and adjust a reproduction speed of the cooking content based on the cooking process of the cooking content and the cooking situation of the user.

The controller may perform control to reproduce the cooking content at a normal speed when the cooking situation of the user matches the cooking process of the cooking content.

The controller may perform control to reproduce the cooking content at a low speed or pause the cooking content when the cooking situation of the user is slower than the cooking process of the cooking content.

The controller may perform control to determine whether the cooking situation of the user matches a cooking sequence of the cooking content when the cooking situation of the user is faster than the cooking process of the cooking content, and reproduce the cooking content at a high speed when the cooking situation of the user matches the cooking sequence of the cooking content.

The controller may perform control to output an object informing that the cooking situation of the user does not match a cooking sequence of the cooking content when the cooking situation of the user does not match the cooking sequence.

The controller may perform control to pause the reproduction of the cooking content when the user is not recognized for a predetermined time or more via the camera during the reproduction of the cooking content.

The user terminal may further include a communication unit for wireless communication with at least one of a kitchen appliance and a household appliance of the user, and the controller may control an operation of the at least one of the kitchen appliance and the household appliance based on the cooking process during the reproduction of the cooking content.

The controller may obtain information of a kitchen appliance used during the cooking process in the cooking content, and obtain information of a first operating time of the kitchen appliance proposed in the cooking process in the cooking content.

The controller may perform control to receive information of the kitchen appliance of the user, and convert the first operating time into a second operating time for the kitchen appliance of the user based on the information of the kitchen appliance of the content and the information of the kitchen appliance of the user.

The controller may perform control to transmit information of the converted second operating time to the kitchen appliance of the user such that the kitchen appliance of the user is set based on the second operating time.

The controller may automatically control the operation of the household appliance based on the cooking process.

The controller may perform control to identify whether an emergency situation has occurred in a surrounding environment of the user via the camera.

The user terminal may further include a microphone for receiving an uttered word of the user, and the controller may perform control to determine whether to perform an operation based on the uttered word based on whether the emergency situation has occurred when the received uttered word is not a wake-up word.

The controller may perform control to ignore the uttered word when the received uttered word is not the wake-up word and the emergency situation has not occurred.

The controller may activate a standby mode for recognizing an additional uttered word when the received uttered word is the wake-up word.

According to one aspect of the present disclosure, provided is a method for controlling a user terminal including recognizing information about a cooking process appearing in cooking content via artificial intelligence, recognizing, via the artificial intelligence, a cooking situation of a user filmed or detected via a camera during reproduction of the cooking content, and adjusting a reproduction speed of the cooking content based on the cooking process of the cooking content and the cooking situation of the user.

Further scope of applicability of the present disclosure will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 5 shows an example of user recognition according to an aspect of the present disclosure;

FIG. 12 shows an example of a display screen of a user terminal that provides a user-customized guide during cooking content reproduction according to an aspect of the present disclosure.

DESCRIPTION OF SPECIFIC EMBODIMENTS

Figure 1:
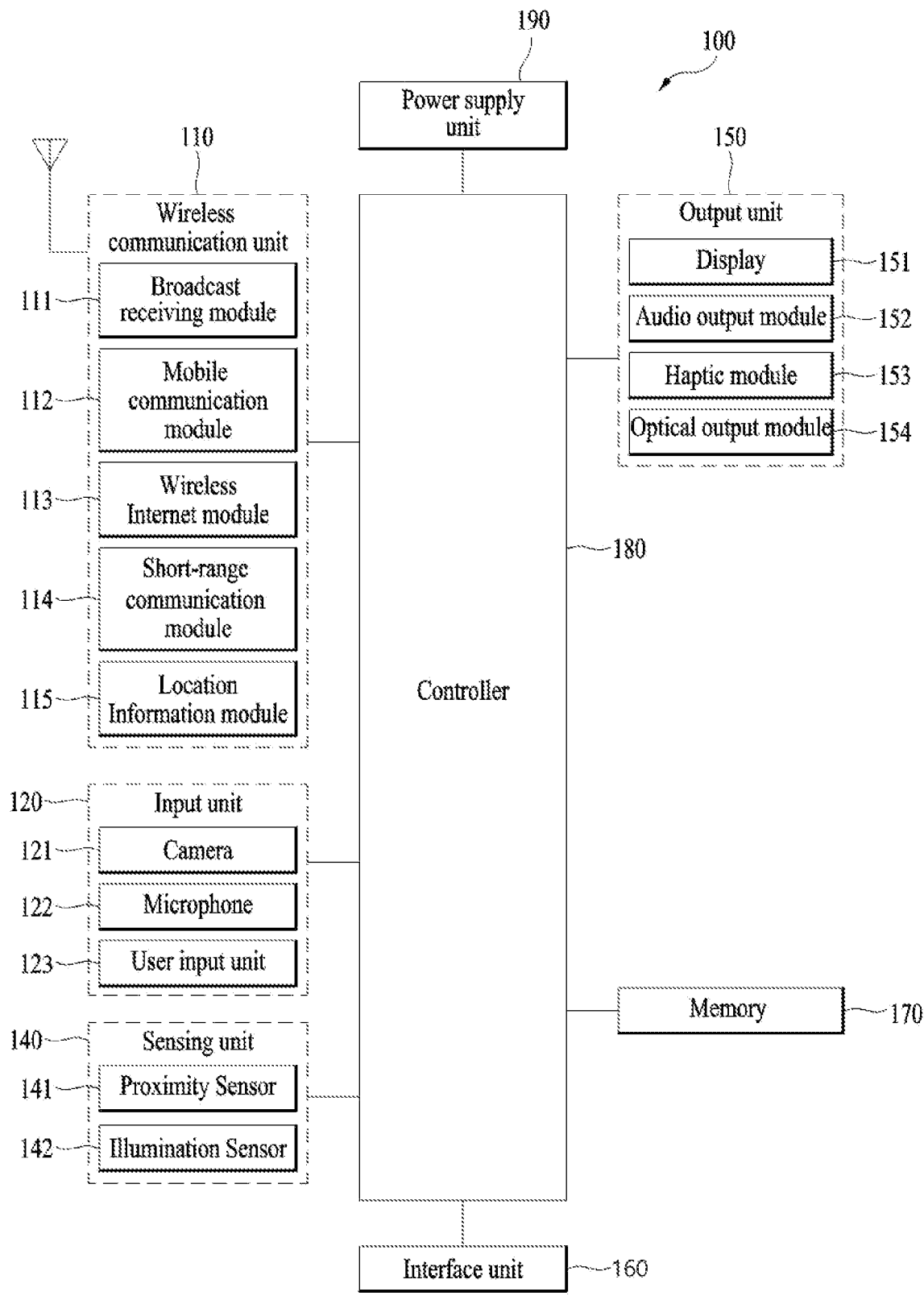
FIG. 1 is a schematic block diagram in terms of hardware of a user terminal related to the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

In the present application, an expression "at least one of A and B" may mean "A", "B", or both "A" and "B".

User terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of user terminals. However, such teachings apply equally to other types of terminals, such as those types noted above. In addition, these teachings may also be applied to stationary terminals such as digital TV, desktop computers, and the like.

Reference is now made to FIG. 1, which is a block diagram of a user terminal in accordance with the present disclosure.

The user terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the user terminal 100 is shown having wireless communication unit 110 configured with several commonly implemented components. For instance, the wireless communication unit 110 typically includes one or more components which permit wireless communication between the user terminal 100 and a wireless communication system or network within which the user terminal is located.

The wireless communication unit 110 typically includes one or more modules which permit communications such as wireless communications between the user terminal 100 and a wireless communication system, communications between the user terminal 100 and another user terminal, communications between the user terminal 100 and an external server. Further, the wireless communication unit 110 typically includes one or more modules which connect the user terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the user terminal, the surrounding environment of the user terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The user terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the user terminal 100 and a user, as well as function as the user input unit 123 which provides an input interface between the user terminal 100 and the user.

The interface unit 160 serves as an interface with various types of external devices that can be coupled to the user terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the user terminal 100 may perform assorted control functions associated with a connected external device, in response to the external device being connected to the interface unit 160.

The memory 170 is typically implemented to store data to support various functions or features of the user terminal 100. For instance, the memory 170 may be configured to store application programs executed in the user terminal 100, data or instructions for operations of the user terminal 100, and the like. Some of these application programs may be downloaded from an external server via wireless communication. Other application programs may be installed within the user terminal 100 at time of manufacturing or shipping, which is typically the case for basic functions of the user terminal 100 (for example, receiving a call, placing a call, receiving a message, sending a message, and the like). It is common for application programs to be stored in the memory 170, installed in the user terminal 100, and executed by the controller 180 to perform an operation (or function) for the user terminal 100.

The controller 180 typically functions to control overall operation of the user terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the user terminal 100. The power supply unit 190 may include a battery, and the battery may be configured to be embedded in the terminal body, or configured to be detachable from the terminal body.

At least some of the components may operate in cooperation with each other to implement an operation, control, or a control method of the user terminal according to various embodiments to be described below. In addition, the operation, the control, or the control method of the user terminal may be implemented on the user terminal by driving at least one application program stored in the memory 170.

Referring still to FIG. 1, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the user terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external user terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), 5G, and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the user terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A, 5G and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the user terminal 100 and a wireless communication system, communications between the user terminal 100 and another user terminal 100, or communications between the user terminal and a network where another user terminal 100 (or an external server) is located, via wireless area networks. One example of the wireless area networks is a wireless personal area networks.

In some embodiments, another user terminal (which may be configured similarly to user terminal 100) may be a wearable device, for example, a smart watch, a smart glass or a head mounted display (HMD), which is able to exchange data with the user terminal 100 (or otherwise cooperate with the user terminal 100). The short-range communication module 114 may sense or recognize the wearable device, and permit communication between the wearable device and the user terminal 100. In addition, when the sensed wearable device is a device which is authenticated to communicate with the user terminal 100, the controller 180, for example, may cause transmission of data processed in the user terminal 100 to the wearable device via the short-range communication module 114. Hence, a user of the wearable device may use the data processed in the user terminal 100 on the wearable device. For example, when a call is received in the user terminal 100, the user may answer the call using the wearable device. Also, when a message is received in the user terminal 100, the user can check the received message using the wearable device.

The location information module 115 is generally configured to detect, calculate, derive or otherwise identify a position of the user terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the user terminal.

As one example, when the user terminal uses a GPS module, a position of the user terminal may be acquired using a signal sent from a GPS satellite. As another example, when the user terminal uses the Wi-Fi module, a position of the user terminal can be acquired based on information related to a wireless access point (AP) which transmits or receives a wireless signal to or from the Wi-Fi module.

The input unit 120 may be configured to permit various types of input to the user terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the user terminal 100. As another example, the cameras 121 may be located in a stereoscopic arrangement to acquire left and right images for implementing a stereoscopic image.

The microphone 122 is generally implemented to permit audio input to the user terminal 100. The audio input can be processed in various manners according to a function being executed in the user terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the user terminal 100. The user input unit 123 may include one or more of a mechanical input element (for example, a key, a button located on a front and/or rear surface or a side surface of the user terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the user terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the user terminal, surrounding environment information of the user terminal, user information, or the like. The controller 180 generally cooperates with the sending unit 140 to control operation of the user terminal 100 or execute data processing, a function or an operation associated with an application program installed in the user terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the user terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the user terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor.

Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the user terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the user terminal 100. For example, the display unit 151 may display execution screen information of an application program executing at the user terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the user terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the user terminal 100.

An optical output module 154 can output a signal for indicating an event generation using light of a light source. Examples of events generated in the user terminal 100 may include message reception, call signal reception, a missed call, an alarm, a schedule notice, an email reception, information reception through an application, and the like.

A signal output by the optical output module 154 may be implemented in such a manner that the user terminal emits monochromatic light or light with a plurality of colors. The signal output may be terminated as the user terminal senses that a user has checked the generated event, for example.

The interface unit 160 serves as an interface for external devices to be connected with the user terminal 100. For example, the interface unit 160 can receive data transmitted from an external device, receive power to transfer to elements and components within the user terminal 100, or transmit internal data of the user terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the user terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the user terminal 100 is connected with an external cradle, the interface unit 160 can serve as a passage to allow power from the cradle to be supplied to the user terminal 100 or may serve as a passage to allow various command signals input by the user from the cradle to be transferred to the user terminal there through. Various command signals or power input from the cradle may operate as signals for recognizing that the user terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The user terminal 100 may also be operated in relation to a network storage device that performs the storage function of the memory 170 over a network, such as the Internet.

The controller 180 may typically control the general operations of the user terminal 100. For example, the controller 180 may set or release a lock state for restricting a user from inputting a control command with respect to applications when a status of the user terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the user terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Functions related to artificial intelligence according to the present disclosure may be operated via the controller and the memory. The controller may include one or a plurality of processors. In this regard, one or the plurality of processors may be a general-purpose processor such as a CPU, an AP, a digital signal processor (DSP), or the like, a graphics-only processor such as a GPU or a vision processing unit (VPU), or an artificial intelligence-only processor such as an NPU. One or the plurality of processors may perform control to process input data based on a predefined operation rule or an artificial intelligence model stored in the memory. Alternatively, when one or the plurality of processors are the artificial intelligence-only processor, the artificial intelligence-only processor may be designed with a hardware structure specialized for processing a specific artificial intelligence model.

The predefined operation rule or the artificial intelligence model may be created via learning. In this regard, the creation via the learning means that the predefined operation rule or the artificial intelligence model set to perform a desired characteristic (or purpose) is created as a basic artificial intelligence model is trained using a number of training data by a learning algorithm. Such learning may be performed in a device itself on which the artificial intelligence according to the present disclosure is implemented, or may be performed via a separate server and/or system. Examples of the learning algorithm include supervised learning, unsupervised learning, semi-supervised learning, and reinforcement learning, but the present disclosure is not limited thereto.

The artificial intelligence model may be composed of a plurality of neural network layers. The plurality of neural network layers may respectively have a plurality of weight values, and a neural network operation may be performed via an operation result of a previous layer and an operation between a plurality of weight values. The plurality of weight values of the plurality of neural network layers may be optimized by a learning result of the artificial intelligence model. For example, the plurality of weight values may be updated such that a loss value or a cost value obtained from the artificial intelligence model during the learning process is reduced or minimized. The artificial neural network may include a deep neural network (DNN), and may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-Network, but the present disclosure may not be limited thereto.

Figure 2:
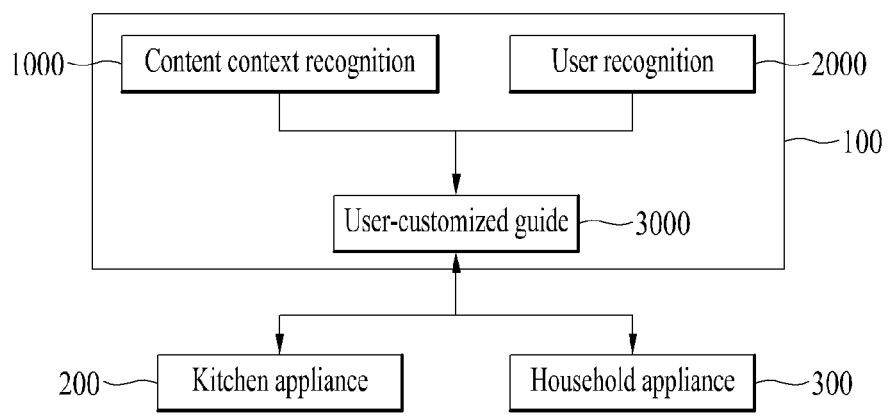
FIG. 2 is a schematic block diagram in terms of hardware of a user terminal in FIG. 1.

Hereinabove, the user terminal related to the present disclosure has been described in terms of hardware. Hereinafter, with reference to FIG. 2, the user terminal in FIG. 1 will be described in terms of software that may operate according to one aspect of the present disclosure.

The user terminal 100 may include a content context recognition module 1000, a user recognition module 2000, and a user-customized guide module 3000. The modules 1000, 2000, and 3000 may operate under control of the controller 180.

The content context recognition module 1000 may analyze an image of cooking-related content (hereinafter, referred to as "cooking content") via the artificial intelligence to recognize a context of the content. In recognizing the context of the content, an audio of the content may also be analyzed. The content may be of a streaming scheme that the user terminal 100 receives in real time via communication or may be stored in the memory 170.

The content context may mean information about at least one of a chef, a cooking category, a cooking difficulty, a cooking ingredient, an ingredient preparing scheme, a cooking operation, a cooking utensil, a method for manipulating the cooking utensil (e.g., a heating intensity of a kitchen heating appliance), a cooking step (e.g., cooking sequence and time), a plating scheme, and the like.

The content context recognition module 1000 may sort information about the recognized context based on the content and store the sorted information in the memory 170. The content context may be stored in a form of metadata for each content.

The user recognition module 2000 may recognize the user of the user terminal 100 via the camera 121. The camera used for recognizing the user may be a depth camera and/or a time of flight (TOF) camera for three-dimensionally sensing a subject, but the present disclosure may not be limited thereto. In one example, the camera may be a 2D camera.

The recognition of the user may include identification of presence or absence of the user within a filming angle of the camera 121 as well as measurement of user's body characteristics and sensing of an operation of the user via the artificial intelligence. The body characteristics may include positions of various body parts (e.g., both hands). The recognition of the user's body characteristics may be performed before reproduction of the cooking content or may be performed during the reproduction of the cooking content.

The sensed operation of the user may be sensed as a gesture input of the user to the user terminal 100. Alternatively, the sensed operation of the user may be the cooking operation of the user who is cooking. In order to identify whether the user is accurately following a cooking operation suggested by the user-customized guide module 3000 to be described below, that is, to identify a cooking progress of the user, the cooking operation of the user may be sensed.

The recognition of the user may include recognition of a space in which the user is located (e.g., in the kitchen or on a kitchen counter). Accordingly, the user recognition module 2000 may recognize and identify a kitchen appliance 200, a household appliance 300, a kitchenware, the cooking ingredient, and the like within the filming angle of the camera 121 via the artificial intelligence. Accordingly, the user recognition module 2000 may identify, for example, a type of kitchen tool and the kitchenware, as well as a type and a quantity of cooking ingredients.

The kitchen appliance 200 and/or the household appliance 300 may not be recognized only via the camera 121. For example, the kitchen appliance 200 and/or the household appliance 300 may be connected to the user terminal 100 via short-range communication and/or Wi-Fi communication, so that, as information of the kitchen appliance 200 and/or household appliance 300 is wirelessly received, the kitchen appliance 200 and/or the household appliance 300 may be recognized by the user recognition module 2000. Examples of the kitchen appliance may include (but not limited to) a refrigerator, a cooktop, an electric range, a dishwasher, a light wave oven, a water purifier, a kitchen hood, and the like, and examples of the household appliance 200 may include (but not limited to) an air conditioner, an air purifier, and the like.

The user-customized guide module 3000 may compare the context of the content reproduced in the user terminal 100 with the recognized user to provide a guide to assist the user in cooking following the content. In providing the guide, the user-customized guide module 3000 may be associated with the kitchen appliance 200 and/or the household appliance 300. The provision of the guide will be described again later.

In addition, the user-customized guide module 3000 may compare the context of the cooking content reproduced in the user terminal 100 with the recognized cooking operation of the user to adjust a speed of the content reproduction when the user fails to follow the content properly or follows the content too easily. For example, when the user fails to follow the content properly, the user-customized guide module 3000 may lower the reproduction speed of the content or pause the reproduction based on a cooking speed of the user.

In addition, the user-customized guide module 3000 may recommend reproduction of cooking content suitable for the user based on at least one of the recognized cooking ingredient, kitchen appliance, and kitchenware. In the content recommendation, the recognized cooking operation of the user may be further considered. This is for recommending cooking content of different difficulties based on a cooking skill of the user estimated based on the cooking operation of the user even when the same cooking ingredient, kitchen appliance, and kitchenware are used.

In addition, although the user-customized guide module 3000 compares the context of the content reproduced in the user terminal 100 with the recognized cooking operation of the user to adjust the reproduction speed of the content, the user-customized guide module 3000 may suggest another cooking content suitable for the user when the user still fails to follow the content properly.

Figure 3:
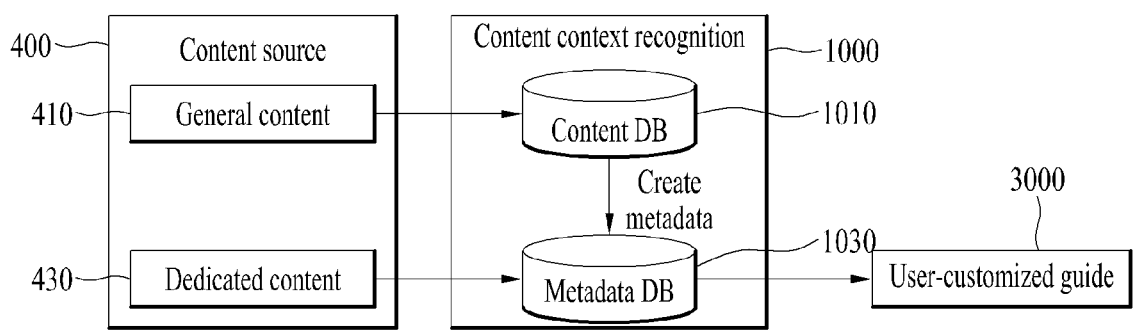
FIG. 3 shows a specified operation of a content context recognition module according to an aspect of the present disclosure.
Figure 4:
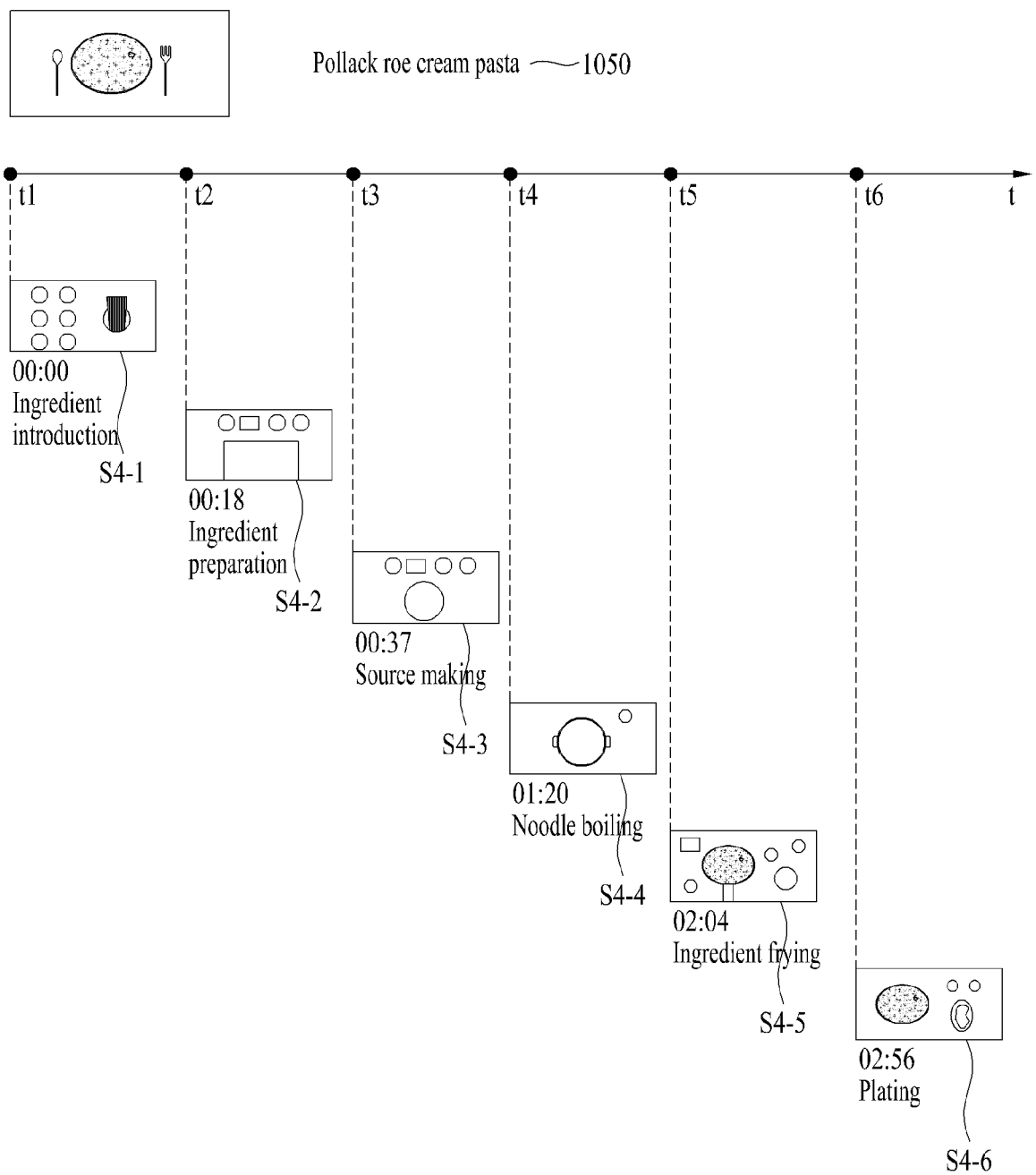
FIG. 4 shows an example of content context recognition of cooking content according to one aspect of the present disclosure.

Hereinafter, with reference to FIGS. 3 and 4, the content context recognition of the cooking content described above will be described in more detail. FIG. 3 shows a specified operation of a content context recognition module according to an aspect of the present disclosure. FIG. 4 shows an example of content context recognition of cooking content according to one aspect of the present disclosure.

As shown in FIG. 3, the content context recognition module 1000 may receive the cooking content from an external content source 400. The external content source 400 may be another user terminal or an external server.

The external content source 400 may include a general content 410 and a dedicated content 430.

The general content 410, which is, for example, content downloadable from a general video sharing platform such as YouTube, may mean content for which metadata that may be utilized in the present disclosure is not prepared or is prepared but is not sufficient.

The dedicated content 430, which is, for example, content downloadable from a dedicated video sharing platform for the present disclosure, may mean content for which the metadata that may be utilized in the present disclosure is prepared.

First, in the case of the general content 410, the content context recognition module 1000 may first download the general content 410 and store the content in a content database 1010.

Then, as shown in FIG. 4, the content context recognition module 1000 may recognize information about a cooking category 1050 and/or cooking steps S4-1 to S4-6 based on the cooking ingredient and the cooking operation of the chef appearing in the cooking content. The content context recognition module 1000 may recognize information about a kitchen appliance, a kitchen tool, and a cooking ingredient used for each cooking step, a cooking operation, a cooking time for each cooking step, and the like.

When the cooking content has timestamp information for each step starting point (t1 to t6), the content context recognition module 1000 may utilize such timestamp information in recognizing the cooking step.

The content context recognition module 1000 may extract the information about the cooking ingredient, the cooking operation, the kitchen tool, the kitchen appliance, the cooking time, and the like via the analysis of the cooking content to create metadata therefor and store the metadata in the metadata database 1030 to correspond to the cooking content.

In the case of the dedicated content 430, the content context recognition module 1000 may download the metadata of the dedicated content 430 and store the metadata in the metadata database 1030 to correspond to the dedicated content. Although not shown, in one example, the content context recognition module 1000 may download the dedicated content 430 together when downloading the metadata and store the content 430 in the content database 1010.

The metadata for each content prepared as such may be provided to the user-customized guide model 3000 and utilized in providing the cooking guide according to the present disclosure to the user.

Hereinafter, with reference to FIG. 5, the user recognition described above will be described in more detail. FIG. 5 shows an example of user recognition according to an aspect of the present disclosure.

As shown in (5-1) in FIG. 5, the user terminal 100 may film the user and a surrounding environment thereof within the filming angle of the camera 121 via the camera 121. The filmed or detected image may be stored only in a volatile memory or may also be stored in a non-volatile memory.

As shown in (5-2) in FIG. 5, the user recognition module 2000 may identify a specific body part (e.g., the both hands) of the user 410 and cooking ingredients 420 and 430 from the filmed image via the artificial intelligence. Although not shown, in addition, the kitchenware, the kitchen appliance, the household appliance, and the like may be identified as described above.

In addition, as shown in (5-3) in FIG. 5, the user recognition module 2000 may identify a position and/or existence of the user 410 within the filming angle from the filmed image via the artificial intelligence.

Figure 6:
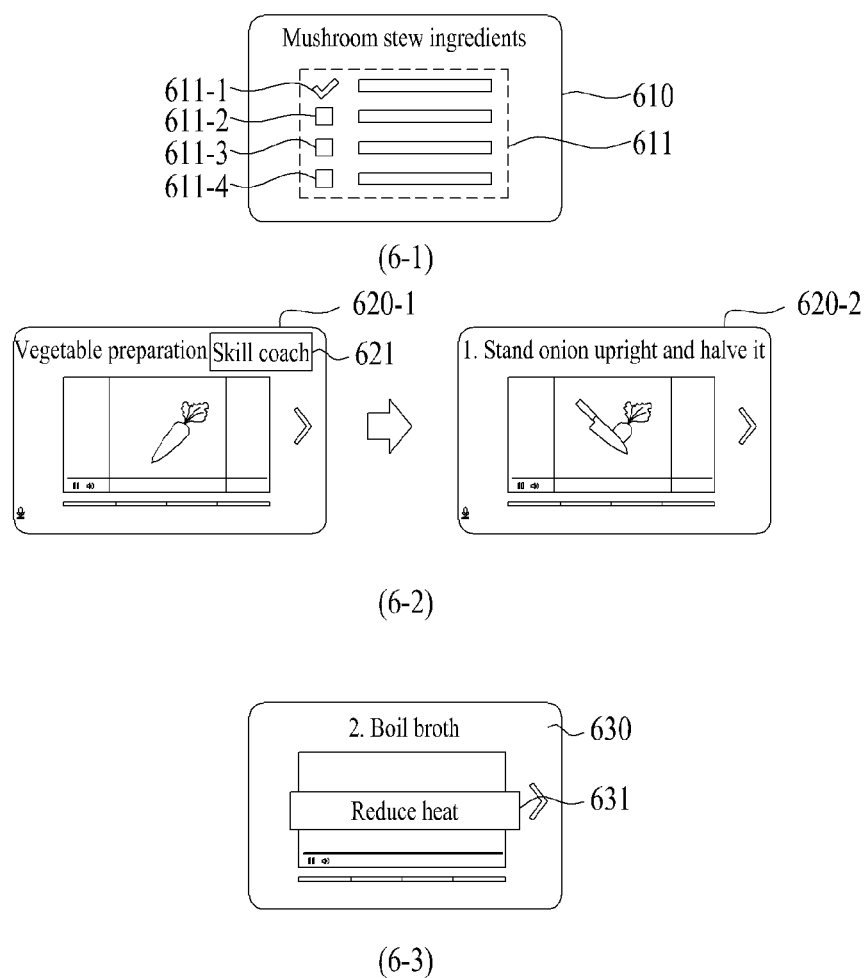
FIG. 6 shows an example of a display screen of a user terminal that provides a user-customized guide during cooking content reproduction according to an aspect of the present disclosure.

Hereinafter, with reference to FIG. 6, the user-customized guide described above will be described in more detail. FIG. 6 shows an example of a display screen of a user terminal that provides a user-customized guide during cooking content reproduction according to an aspect of the present disclosure.

The user terminal 100 may reproduce the cooking content. The reproduced cooking content may be content selected by the user or content recommended by the user-customized guide module 3000.

In reproducing the cooking content, the user terminal 100 may reproduce an image 610 of a portion corresponding to a step of introducing the cooking ingredient as shown in (6-1) in FIG. 6. The step of introducing the cooking ingredient may correspond, for example, to step S4-1 in FIG. 4.

Then, the user-customized guide module 3000 may receive information about the cooking ingredient introduced from the content context recognition module 1000.

In addition, the user-customized guide module 3000 may receive information about a cooking ingredient the user has from the user recognition module 2000. As described above, the information about the cooking ingredient that the user has may be information of an ingredient identified by the camera 121 and/or an ingredient that is not identified by the camera 121, but is recognized, by the kitchen appliance 200 (e.g., the refrigerator) associated with the user terminal 100, to be located in the kitchen appliance 200.

In displaying an image 610 about the introduction of the cooking ingredient, the user-customized guide module 3000 may display a list 611 of cooking ingredients required for the cooking content.

In this regard, the user-customized guide module 3000 may allow a cooking ingredient 611-1, which is determined not to be currently possessed by the user, among cooking ingredient items in the list 611 to be displayed visually differently from cooking ingredients 611-2, 611-3, and 611-4 determined to be possessed by the user. In (6-1) in FIG. 6, it is illustrated that the cooking ingredient items are displayed to be visually different based on existence of a check mark.

In reproducing the cooking content, the user terminal 100 may reproduce an image 620-1 of a portion corresponding to a step of guiding cooking ingredient preparation as shown in (6-2) in FIG. 6. The step of introducing the cooking ingredient preparation may correspond, for example, to step S4-2 in FIG. 4. The reproduction of the image of the step of guiding the cooking ingredient preparation may be started when all of the required cooking ingredients are identified as ready. Alternatively, the reproduction of the image of the step of guiding the cooking ingredient preparation may be started when a user inputs a voice, a gesture, or a touch command.

The user-customized guide module 3000 may receive information about a cooking operation related to the cooking ingredient preparation introduced from the content context recognition module 1000.

In addition, the user-customized guide module 3000 may recognize the cooking operation of the user from the user recognition module 2000. The cooking operation of the user may be the operation recognized by the camera 121, as described above.

When it is determined that the cooking operation of the user differs from the cooking operation introduced by the cooking content by a level equal to or higher than a certain level in terms of speed and/or accuracy, the user-customized guide module 3000 may search for another content suitable for the cooking operation related to the cooking ingredient preparation and display an object 621 for introducing the searched content. The object 621 may contain link information for connection to the searched content. Accordingly, when the object 621 is selected by, for example, the voice, the gesture, or the touch of the user, the user terminal 621 may reproduce an image 620-2 of the searched content. When the image 620-2 of the searched content is reproduced, the reproduction of the cooking content may be automatically paused, and when the reproduction of the image 620-2 of the searched content is finished, the reproduction of the image 620-1 of the cooking content may be resumed from a time point at which the reproduction is paused.

In reproducing the cooking content, the user terminal 100 may reproduce an image 630 of a portion corresponding to a step of guiding a cooking process using the cooking ingredients as well as the cooking ingredient preparation as shown in (6-3) in FIG. 6. The step of guiding the cooking ingredient preparation and the cooking process may correspond to, for example, one of the steps S4-2 to S4-6 in FIG. 4.

The user-customized guide module 3000 may receive information about the cooking operation related to the cooking ingredient preparation and the cooking process introduced from the content context recognition module 1000.

In addition, the user-customized guide module 3000 may recognize the cooking operation of the user from the user recognition module 2000. The cooking operation of the user may be the operation recognized by the camera 121, as described above.

When it is determined that the cooking operation of the user differs from the cooking operation introduced by the cooking content by the level equal to or higher than the certain level in terms of the speed and/or the accuracy, the user-customized guide module 3000 may adjust the reproduction speed of the cooking content. However, in the case of the cooking content, in many cases, a heating intensity (high/medium/low) of the kitchen heating apparatus being in use is determined in relation to the reproduction speed (that is, a reproduction time) of the cooking content. When only the reproduction speed of the cooking content is adjusted, the cooking content may not match the determined heating intensity. For example, it is assumed that cooking with high heat for less than 2 minutes is original content of the cooking content. In this case, when the reproduction speed of the cooking content is lowered, the high heat may be maintained for more than 2 minutes, so that the dish may be overcooked.

In preparation for such case, when adjusting the reproduction speed of the cooking content, the user-customized guide module 3000 may display an alarm 631 informing that the heating intensity of the kitchen heating apparatus should also be adjusted.

Alternatively, instead of displaying the alarm 631, the user-customized guide module 3000 may transmit a control signal for adjusting the heating intensity of the kitchen heating apparatus to match the adjusted reproduction speed of the cooking content to the kitchen heating apparatus, and the kitchen heating apparatus may automatically adjust the heating intensity in response to the control signal even without a separate user manipulation.

Alternatively, when the user-customized guide module 3000 identifies that there is no change in the heating intensity of the kitchen heating apparatus even after a predetermined time has elapsed after the alarm 631 is displayed, the user-customized guide module 3000 may transmit a control signal for adjusting the heating intensity of the kitchen heating device to match the adjusted reproduction speed of the cooking content to the kitchen heating apparatus, and the kitchen heating apparatus may automatically adjust the heating intensity in response to the control signal even without the separate user manipulation.

Figure 7:
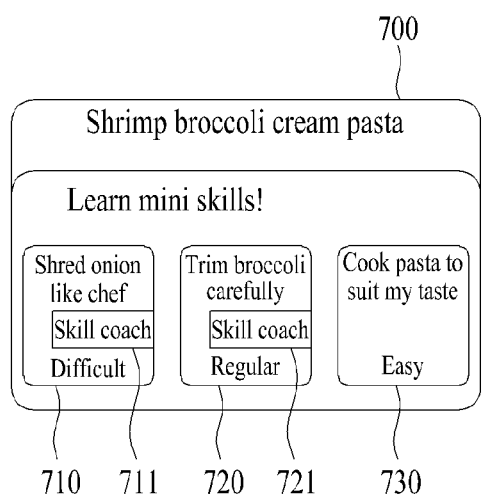
FIG. 7 shows an example of a display screen of a user terminal that provides a user-customized guide during cooking content reproduction according to one aspect of the present disclosure.

Hereinafter, with reference to FIG. 7, the user-customized guide described above will be described in more detail. FIG. 7 shows an example of a display screen of a user terminal that provides a user-customized guide during cooking content reproduction according to one aspect of the present disclosure.

As described above, when it is determined that the cooking operation of the user differs from the cooking operation introduced by the cooking content by the level equal to or higher than the certain level in terms of the speed and/or the accuracy, the user-customized guide module 3000 may search for another content suitable for the cooking operation related to the cooking ingredient preparation and display the object 621 for introducing the searched content.

However, the user-customized guide module 3000 may introduce said another content in advance before the cooking is started in earnest in the cooking content.

For example, as shown in FIG. 7, the user terminal 100 may reproduce an image 700 of introducing the cooking operation required in the cooking content. The cooking operation introducing image 700 is an image displayed in advance before the cooking content is reproduced when the cooking content is selected for the reproduction. The cooking content may be reproduced after the cooking operation introducing image 700 is reproduced.

The cooking operation introducing image 700 may be an image generated by the user-customized guide 3000 based on the result of analyzing the cooking content via the artificial intelligence by the content context recognition module 1000.

The cooking operation introducing image 700 may list at least one cooking operation required in the cooking content. It is illustrated in FIG. 7 that a first cooking operation 710, a second cooking operation 720, and a third cooking operation 730 are listed.

The user-customized guide module 3000 may search for other content suitable for each cooking operation, and display an object for introducing it when the content is searched to correspond to each cooking operation. It is illustrated in FIG. 7 that a first object 711 for a first cooking operation 710 and a second object 721 for a second cooking operation 720 are displayed.

A description of at least one of the first object 711 and the second object 721 being selected and displayed is the same as the description made with reference to FIG. 6.

Figure 8:
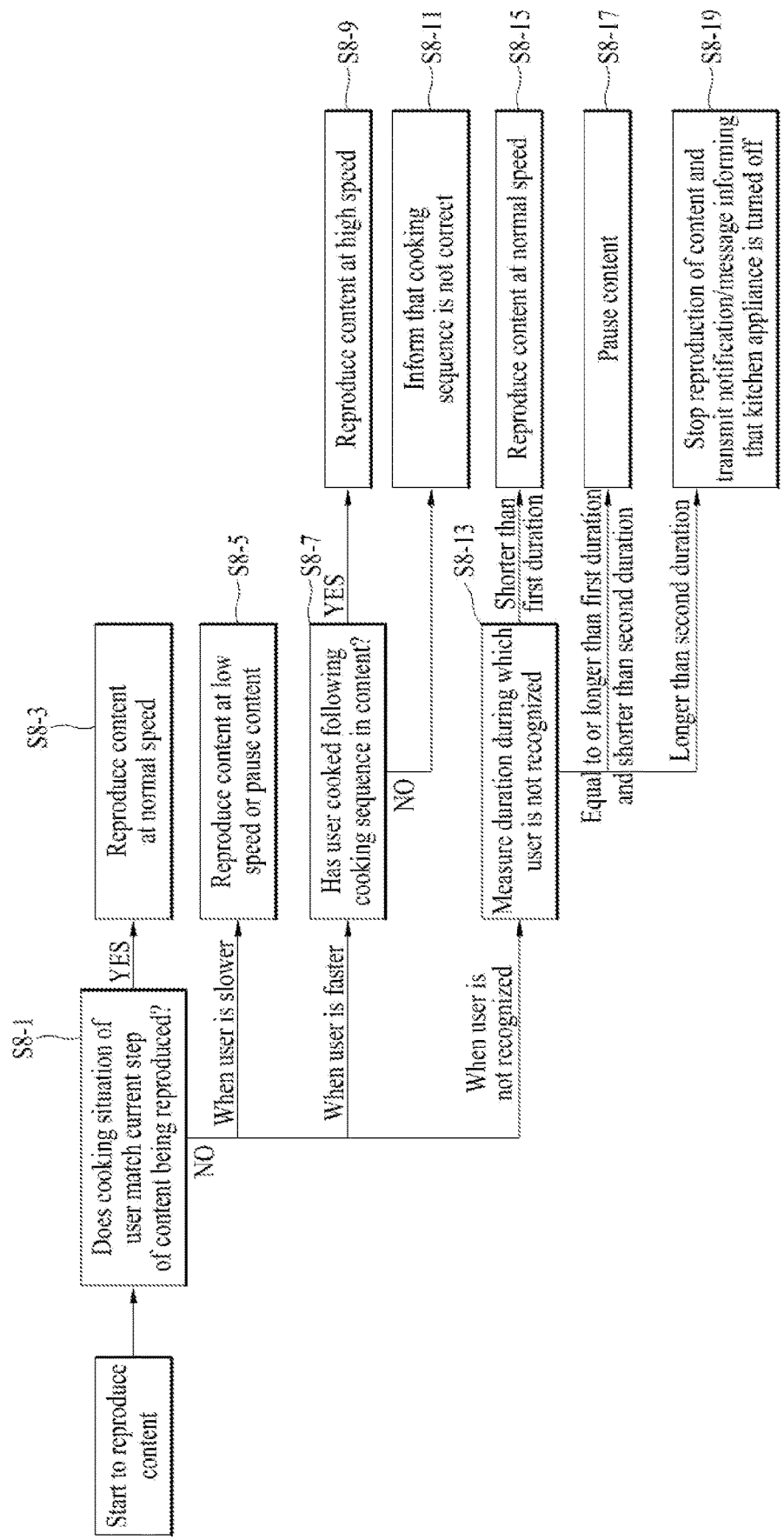
FIG. 8 is a flowchart regarding a process of providing a user-customized guide during cooking content reproduction according to one aspect of the present disclosure.

Hereinafter, with reference to FIG. 8, the user-customized guide described above will be described in more detail. FIG. 8 is a flowchart regarding a process of providing a user-customized guide during cooking content reproduction according to one aspect of the present disclosure.

While the cooking content is being reproduced, the user-customized guide module 3000 may determine whether a cooking situation of the user matches a currently reproduced step (that is, a cooking process) of the cooking content [S8-1].

When it is determined that the cooking situation of the user matches the currently reproduced step, the user-customized guide module 3000 may reproduce the cooking content at a normal speed (a 1× speed) [S8-3].

When it is determined that the cooking situation of the user does not match the currently reproduced step because the cooking situation of the user is slower than the currently reproduced step, the user-customized guide module 3000 may reproduce the cooking content at a low speed (e.g., lower than the 1× speed) or pause the cooking content until the cooking situation of the user matches the currently reproduced step [S8-5]. Depending on how much slower the cooking situation of the user than the currently reproduced step, one of the low-speed reproduction and the pause may be determined. For example, when the cooking situation of the user becomes slower than the currently reproduced step, the low-speed reproduction may be selected, and when the cooking situation of the user becomes much slower than the currently reproduced step even though the cooking content is reproduced at the low speed, the pause may be selected.

When it is determined that the cooking situation of the user does not match the currently reproduced step because the cooking situation of the user is faster than the currently reproduced step, the user-customized guide module 3000 may determine whether the user has cooked following a cooking sequence in the cooking content (that is, whether the user has omitted any of the cooking steps) [S8-7]. This may be determined based on the cooking operation of the user recognized by the user recognition module 2000 during the reproduction of the cooking content.

When the user has cooked following the cooking sequence (that is, when the user has not omitted any of the cooking steps), the user-customized guide module 3000 may reproduce the cooking content at high speed (e.g., higher than the 1× speed) until the reproduced step of the cooking content matches the cooking situation of the user [S8-9].

However, when the user has not cooked following the cooking sequence (that is, when the user has omitted any of the cooking steps), the user-customized guide module 3000 may output a message informing that the cooking sequence is not correct (that is, there is an omission made by the user in the cooking steps) in voice, text, and/or graphic [S8-11]. In addition, the user-customized guide module 3000 may output an object (not shown) for reproducing the cooking content again from a time point corresponding to the omission (a time point in the past than a current content reproduction time point). When the object is selected by, for example, the voice, the gesture, or the touch of the user, the user terminal 621 may reproduce the content again from the time point described above.

On the other hand, when it is determined that the cooking situation of the user does not match the currently reproduced step because the user is not recognized within the filming angle of the camera 121, the user-customized guide module 3000 may measure a duration during which the user is not recognized (hereinafter, a "user unrecognized duration") [S8-13].

When the user unrecognized duration is shorter than a first duration (e.g., 3 minutes), the user-customized guide module 3000 may reproduce the cooking content at the normal speed (the 1× speed) [S8-17].

When the user unrecognized duration is equal to or longer than a second duration, the user-customized guide module 3000 may stop the reproduction of the cooking content [S8-19]. In addition, when there are a kitchen appliance and a household appliance operating in association with the cooking content, the user-customized guide module 3000 may control the corresponding kitchen appliance and household appliance to be turned off. In addition, when there is a mobile device (e.g., a smart phone, a wearable device, and the like) in association with the user terminal 100, the user-customized guide module 3000 may transmit a message informing that the reproduction of the cooking content has been stopped to the mobile device.

The control on whether to pause the cooking content and adjust the reproduction speed of the cooking content may also be performed by a directly input command of the user, such as the voice, the gesture, and the touch of the user.

When the user input command is received while the cooking content is reproduced based on whether to adjust the reproduction speed of the cooking content and/or pause the cooking content determined in the step S8-1, whether to adjust the reproduction speed of the cooking content and/or pause the cooking content determined in the step S8-1 may be reset and the cooking content may be reproduced in response to the user input command.

Figure 9:
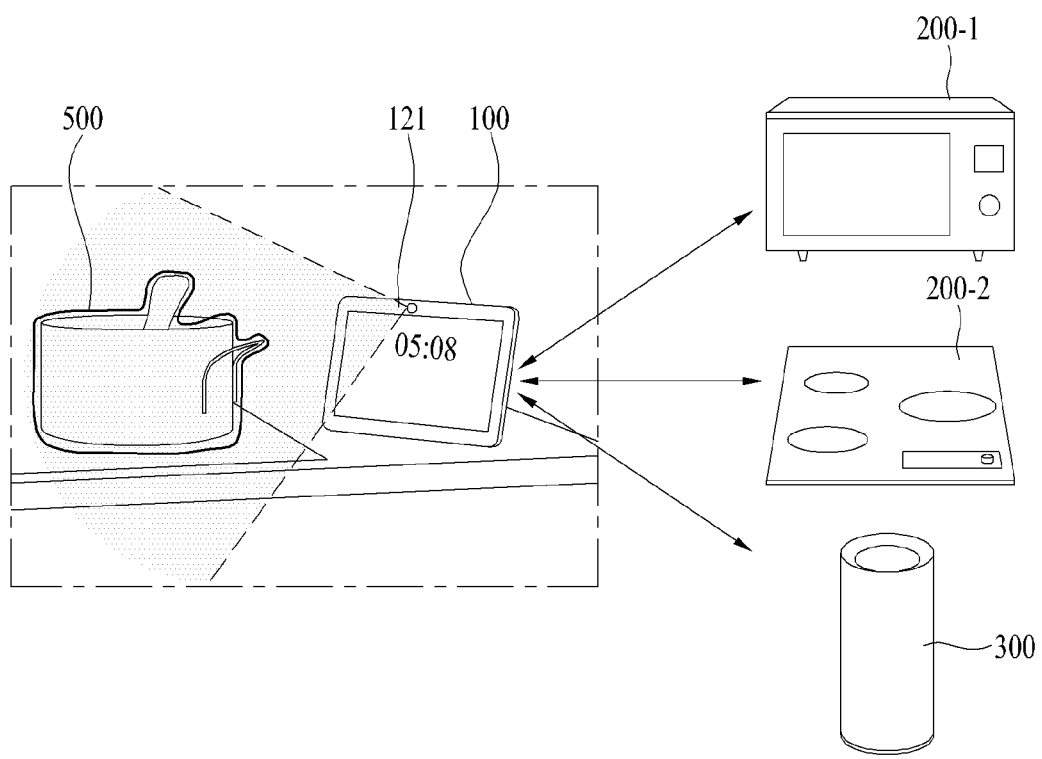
FIG. 9 shows an example of association with a kitchen appliance and/or a household appliance in providing a user-customized guide during cooking content reproduction according to one aspect of the present disclosure.

Hereinafter, the user-customized guide described above will be described in more detail with reference to FIG. 9. FIG. 9 shows an example of association with a kitchen appliance and/or a household appliance in providing a user-customized guide during cooking content reproduction according to one aspect of the present disclosure.

As described above, in providing the user-customized guide, the user terminal 100 may be associated with the kitchen heating apparatus 200 and the household appliance 300.

It is illustrated in FIG. 9 that the user terminal 100 is associated with a first kitchen heating apparatus 200-1 (e.g., an electric oven or a microwave oven), a second kitchen heating apparatus 200-2 (e.g., a cooktop), and a first household appliance 300 (e.g., an air purifier) via short-distance communication or Wi-Fi communication.

When the first kitchen heating apparatus 200-1 is the electric oven, in consideration of a next step (e.g., frying) during one cooking step (e.g., ingredient preparation) of the cooking content, the user-customized guide module 3000 may turn on the electric oven in advance and control the electric oven to be preheated to an appropriate temperature. In addition, the user-customized guide module 3000 may automatically set an operating timer of the first kitchen heating apparatus 200-1 to an appropriate time required in the cooking content in advance.

Figure 10:
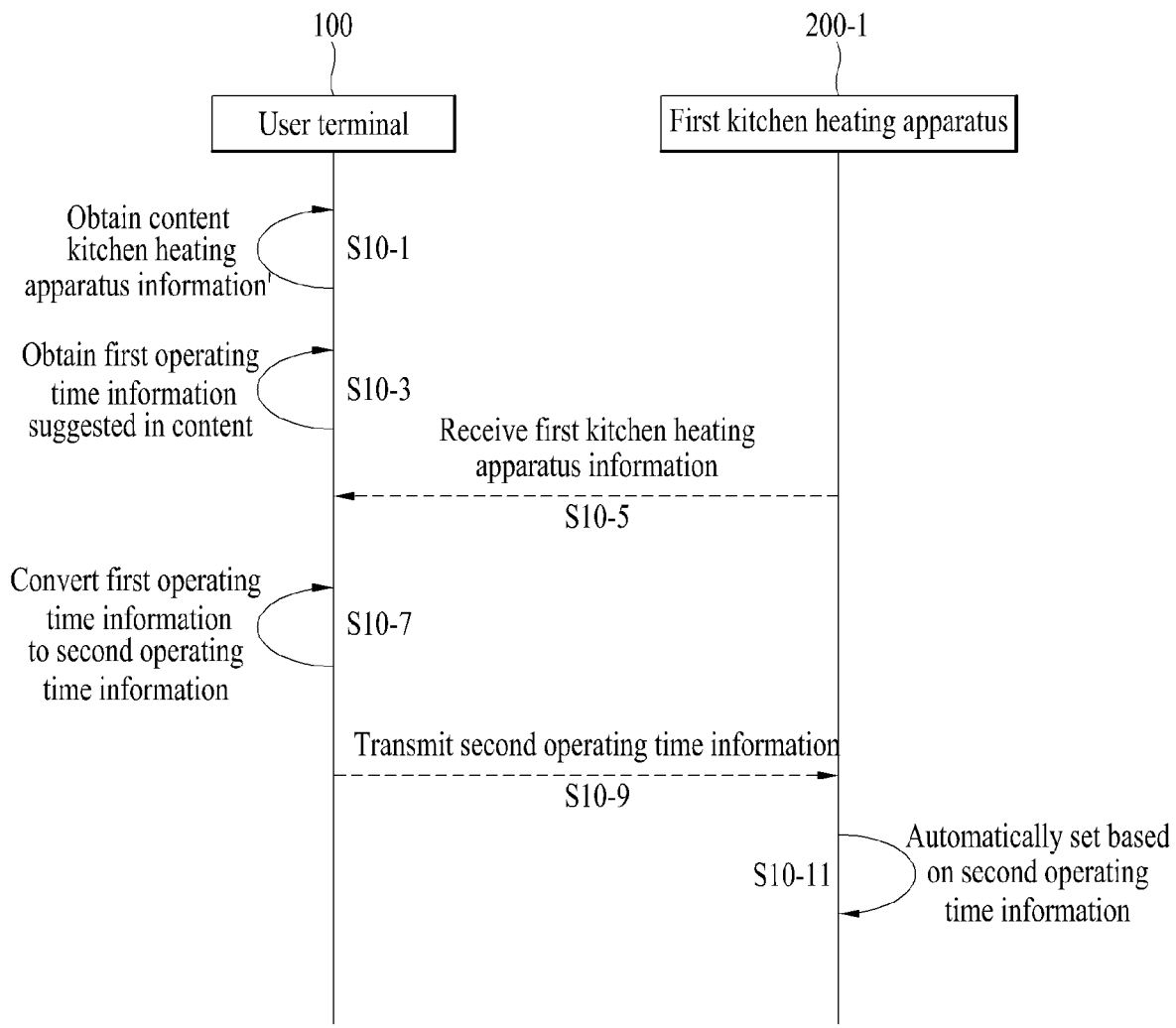
FIG. 10 shows a flowchart illustrating a user terminal and a kitchen appliance operating in association with each other in providing a user-customized guide during cooking content reproduction according to one aspect of the present disclosure.

The set appropriate time will be described with further reference to FIG. 10. FIG. 10 shows a flowchart illustrating a user terminal and a kitchen appliance operating in association with each other in providing a user-customized guide during cooking content reproduction according to one aspect of the present disclosure. In FIG. 10, it is assumed that the first kitchen heating apparatus is the microwave oven.

First, the user-customized guide module 3000 of the user terminal 100 may identify a released model and/or heating output information (e.g., heating power capacity (watts)) (hereinafter, referred to as 'content kitchen heating apparatus information') of the kitchen heating apparatus used for the cooking in the cooking content via the content context recognition module 1000 [S10-1].

In addition, the user-customized guide module 3000 may identify operating time information (referred to as "first operating time information") to be set in the kitchen heating apparatus used for the cooking in the cooking content via the content context recognition module 1000 [S10-3].

In addition, the user-customized guide 3000 may receive released model and/or heating output information (hereinafter, referred to as "first kitchen heating apparatus information") of the first kitchen heating apparatus from the first kitchen heating apparatus (200-1) [S10-5].

An order of the step S10-1, the step S10-3, and the step S10-5 may be changed or two or more steps may be performed substantially simultaneously.

Next, the user-customized guide module 3000 may convert the first operating time information based on the information of the content kitchen heating apparatus to be suitable for the first kitchen heating apparatus [S10-7]. The operating time information converted to be suitable for the first kitchen heating apparatus will be referred to as 'second operating time information'.

For example, it is assumed that the heating power capacity of the content kitchen heating apparatus is 1000 watts and a heating power capacity of the first kitchen heating apparatus 200-1 is 700 watts. In addition, it is assumed that an operating time of the content kitchen heating apparatus suggested in the cooking content is 7 minutes (a first operating time).

Then, in consideration of the heating power capacity of the content kitchen heating apparatus and the heating power capacity of the first kitchen heating apparatus 200-1, the user-customized guide 3000 may convert 7 minutes suggested in the cooking content into 10 minutes (a second operating time) to be suitable for the first kitchen heating apparatus 200-1.

In addition, the user-customized guide module 3000 may transmit the converted second operating time information to the first kitchen heating apparatus 200-1 [S10-9], and the first kitchen heating apparatus 200-1 may control the timer to be automatically set based on the second operating time information [S10-11].

In one example, separately from the steps S10-9 and S10-11, the user-customized guide module 3000 may display the converted second operating time information together with the first operating time. In this regard, the content kitchen heating apparatus information and the first kitchen heating apparatus information may be displayed together. Accordingly, the user may directly set the appropriate time in the first kitchen heating apparatus 200-1 by viewing the first operating time and the second operating time.

Again, returning to FIG. 9, the user-customized guide module 3000 may identify a surrounding environment of the user via the user recognition module 2000 as described above. For example, the user-customized guide 3000 may identify a pot 500 placed on the second kitchen heating apparatus 200-2 within the filming angle of the camera 121 and identify whether the pot is boiling over or steam or smoke reaches a certain level. When it is sensed that the pot 500 is boiling over or the steam or the smoke reaches the certain level, the user-customized guide 3000 may automatically reduce the heating intensity of the second kitchen heating apparatus 200-2 or turn off the second kitchen heating apparatus 200-2.

Figure 11:
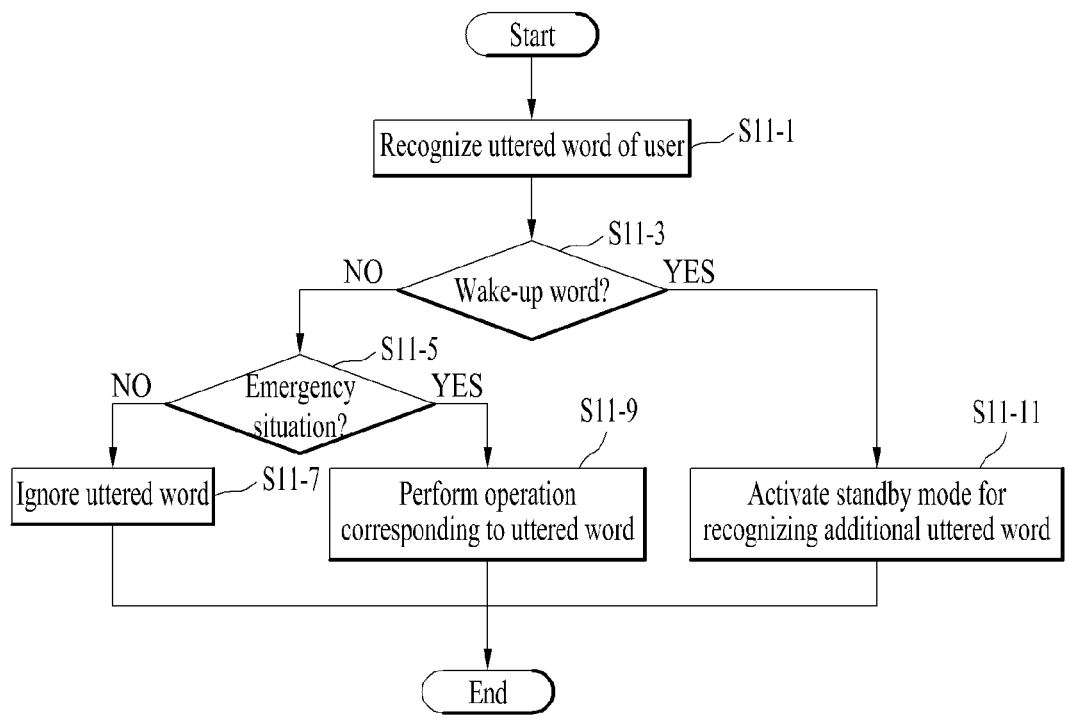
FIG. 11 shows a flowchart illustrating a user terminal and a kitchen appliance operating in association with each other in providing a user-customized guide during cooking content reproduction according to an aspect of the present disclosure.

In one example, the user-customized guide module 3000 may control the second kitchen heating apparatus 200-2 based on an uttered word of the user. This will be further described with reference to FIG. 11. FIG. 11 shows a flowchart illustrating a user terminal and a kitchen appliance operating in association with each other in providing a user-customized guide during cooking content reproduction according to an aspect of the present disclosure.

The user terminal 100 may activate the microphone 122 during the cooking content reproduction, and recognize the uttered word (e.g., "light off") of the user [S11-1].

Then, the user-customized guide module 3000 may determine whether the uttered word matches a wake-up word (WUW) predefined in the user terminal 100 [S11-3].

The user-customized guide module 3000 may activate a standby mode for recognizing an additional uttered word of the user when the uttered word matches the wake-up word and may perform an operation corresponding to the additional uttered when the additional uttered word is recognized [S11-11].

However, when the uttered word matches the wake-up word, the user-customized guide module 3000 may determine whether an emergency situation has occurred in the surrounding environment of the user [S11-5]. The emergency situation may be, for example, a situation in which the pot is boiling over or the steam or the smoke reaches the certain level as described above.

When it is determined that it is not the emergency situation, the user-customized guide module 3000 may ignore the uttered word and do not perform a specific operation for the emergency situation [S11-7].

However, when it is determined that it is the emergency situation, the user-customized guide module 3000 may perform an operation corresponding to the uttered word even in an absence of the wake-up word [S11-9]. The operation corresponding to the uttered word may be controlling the second kitchen heating apparatus 200-2 to reduce the heating intensity of the second kitchen heating apparatus 200-2 or to turn off the second kitchen heating apparatus 200-2.

Again, returning to FIG. 9, when it is determined that a step with a lot of smell is activated during the reproduction of the cooking content, the user-customized guide module 3000 may perform control to automatically turn on and operate the first household appliance 300 (e.g., the air purifier) in advance, or to increase an operation intensity of the first household appliance 300 in advance.

Hereinafter, with reference to FIG. 12, the user-customized guide described above will be described in more detail. FIG. 12 shows an example of a display screen of a user terminal that provides a user-customized guide during cooking content reproduction according to an aspect of the present disclosure.

As shown in (12-1) in FIG. 12, when a final step of the cooking based on the cooking content is reached and a cooking situation recognized by the user recognition module 2000 is also identified as matching the final step, the user-customized guide module 3000 may perform control to automatically turn off the kitchen heating apparatus and display an alarm object 1210 informing that the kitchen heating apparatus is turned off.

Then, the user-customized guide module 3000 may search and display a plurality of contents 1221, 1223, 1225, and 1227 related to various plating schemes for the finished dish as shown in (12-2) in FIG. 12.

When one of the plurality of contents is selected by the voice, the gesture, or the touch of the user, the user-customized guide module 3000 may reproduce and display the selected content 1225 as shown in (12-3) in FIG. 12. Not only the plating, but also a garnish, a tableware, an accessory, and the like may be guided via the reproduced content.

Figure 13:
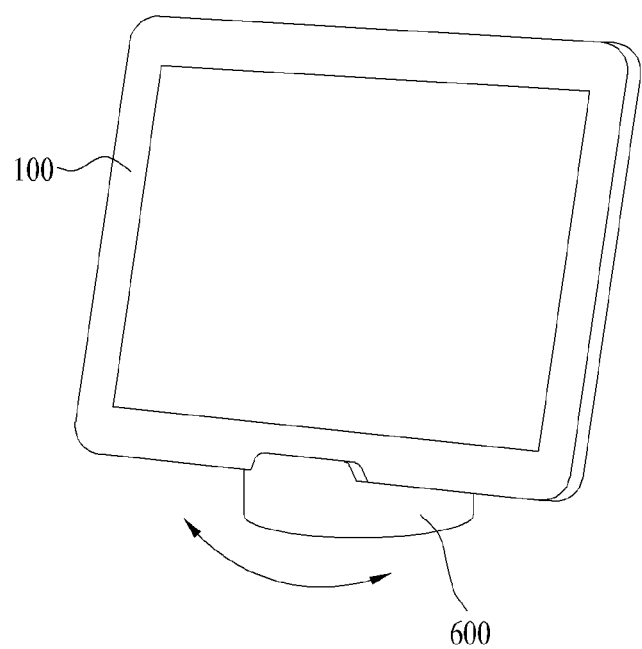
FIG. 13 shows a cradle that may be associated with a user terminal according to an aspect of the present disclosure.

Hereinafter, with further reference to FIG. 13, a cradle 600 that may be associated with the user terminal 100 will be described. FIG. 13 shows a cradle that may be associated with a user terminal according to an aspect of the present disclosure.

The user terminal 100 may be mounted on the cradle 600 via the interface unit 160. The cradle 600 may be capable of panning in a left and right direction.

The user-customized guide module 3000 may identify the user via the camera 121 during the reproduction of the cooking content and may transmit, to the cradle 600, a control signal for the cradle 600 to pan such that the display 151 of the user terminal 100 is directed in a direction to a location of the identified user. The cradle 600 may pan in response to the control signal. That is, the user terminal 100 may track a movement of the user who is cooking and rotate the display screen based on the movement.

Effects of the method for providing the customer-customized cooking content and the terminal for implementing the same will be described as follows.

According to at least one of several aspects of the present disclosure, a quality of the dish and interest in cooking may be increased by allowing the user to cook at a pace that suits a user's level in consideration of the user's cooking skills.

According to at least one of several aspects of the present disclosure, even when the outputs of the kitchen heating apparatus used in the cooking content and the kitchen heating apparatus used at the user's home are different, the cooking time is guided by converting the operating time of the kitchen heating apparatus used in the cooking content, so that the user may cook more accurately.

According to at least one of several aspects of the present disclosure, the user terminal may provide an environment more suitable for cooking in association with a near kitchen tool and/or home appliance.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A user terminal comprising:
   a display;
   a camera;
   a communication interface for wireless communication with at least one appliance of a user; and
   a controller configured to:
      recognize information about a cooking process appearing in cooking content via artificial intelligence;
      recognize, via the artificial intelligence, a cooking situation of a user detected via the camera during reproduction of the cooking content; and
      adjust a reproduction speed of the cooking content based on the cooking process of the cooking content and the cooking situation of the user,
   wherein the controller is further configured to:
      download the cooking content from a video sharing platform;
      obtain information of a first kitchen appliance used during the cooking process in the cooking content downloaded from the video sharing platform;
      obtain information of a first operating time of the first kitchen appliance proposed in the cooking process in the cooking content;
      receive information of a second kitchen appliance of the user; and
      convert the first operating time into a second operating time for the second kitchen appliance of the user based on the information of the first kitchen appliance of the content and the information of the second kitchen appliance of the user,
   wherein the controller is configured to adjust a heating intensity of the second kitchen appliance to match the reproduction speed of the cooking content adjusted based on the cooking situation of the user, and
   wherein the controller is configured to:
      detect the user's cooking operation via the camera; and
      in response to the user's cooking operation differing from the cooking content's cooking operation by a predetermined level, search for new cooking content and display an object of the new cooking content.

2. The user terminal of claim 1, wherein the controller is configured to reproduce the cooking content at a normal speed when the cooking situation of the user matches the cooking process of the cooking content.

3. The user terminal of claim 1, wherein the controller is configured to reproduce the cooking content at a low speed or pause the cooking content when the cooking situation of the user is slower than the cooking process of the cooking content.

4. The user terminal of claim 1, wherein the controller is configured to:
   determine whether the cooking situation of the user matches a cooking sequence of the cooking content when the cooking situation of the user is faster than the cooking process of the cooking content; and
   reproduce the cooking content at a high speed when the cooking situation of the user matches the cooking sequence of the cooking content.

5. The user terminal of claim 1, wherein the controller is configured to output an object informing that the cooking situation of the user does not match a cooking sequence of the cooking content when the cooking situation of the user does not match the cooking sequence.

6. The user terminal of claim 1, wherein the controller is configured to pause the reproduction of the cooking content when the user is not recognized for a predetermined time or more via the camera during the reproduction of the cooking content.

7. The user terminal of claim 1, wherein the controller is configured to transmit information of the converted second operating time to the second kitchen appliance of the user such that the second kitchen appliance of the user is set based on the second operating time.

8. The user terminal of claim 1, wherein the controller is configured to automatically control a household appliance of the user based on the cooking process.

9. The user terminal of claim 8, further comprising:
a microphone for receiving an uttered word of the user, wherein the controller is configured to determine whether to perform an operation based on the uttered word based on whether the emergency situation has occurred when the received uttered word is not a wake-up word.

10. The user terminal of claim 9, wherein the controller is configured to ignore the uttered word when the received uttered word is not the wake-up word and the emergency situation has not occurred.

11. The user terminal of claim 9, wherein the controller is configured to activate a standby mode for recognizing an additional uttered word when the received uttered word is the wake-up word.

12. The user terminal of claim 1, wherein the controller is configured to identify whether an emergency situation has occurred in a surrounding environment of the user via the camera.

13. A method for controlling a user terminal, the method comprising:
recognizing information about a cooking process appearing in cooking content via artificial intelligence;
recognizing, via the artificial intelligence, a cooking situation of a user detected via a camera during reproduction of the cooking content; and
adjusting a reproduction speed of the cooking content based on the cooking process of the cooking content and the cooking situation of the user,
wherein the method further comprises:
downloading the cooking content from video sharing platform;
obtaining information of a first kitchen appliance used during the cooking process in the cooking content downloaded from the video sharing platform;
obtaining information of a first operating time of the first kitchen appliance proposed in the cooking process in the cooking content;
receiving information of a second kitchen appliance of the user; and
converting the first operating time into a second operating time for the second kitchen appliance of the user based on the information of the first kitchen appliance of the content and the information of the second kitchen appliance of the user,
wherein the method further comprises:
adjusting a heating intensity of the second kitchen appliance to match the reproduction speed of the cooking content adjusted based on the cooking situation of the user, and
wherein the method further comprises:
detecting the user's cooking operation via the camera; and
in response to the user's cooking operation differing from the cooking content's cooking operation by a predetermined level, searching for new cooking content and displaying an object of the new cooking content.

14. The method of claim 13, further comprising:
reproducing the cooking content at a normal speed when the cooking situation of the user matches the cooking process of the cooking content.

15. The method of claim 13, further comprising:
reproducing the cooking content at a low speed or pause the cooking content when the cooking situation of the user is slower than the cooking process of the cooking content.

16. The method of claim 13, further comprising:
determining whether the cooking situation of the user matches a cooking sequence of the cooking content when the cooking situation of the user is faster than the cooking process of the cooking content; and
reproducing the cooking content at a high speed when the cooking situation of the user matches the cooking sequence of the cooking content.

17. The method of claim 13, further comprising:
outputting an object informing that the cooking situation of the user does not match a cooking sequence of the cooking content when the cooking situation of the user does not match the cooking sequence.

* * * * *